United States Patent
Sonobe et al.

(10) Patent No.: US 9,508,494 B2
(45) Date of Patent: Nov. 29, 2016

(54) CARBONACEOUS MATERIAL FOR NEGATIVE ELECTRODES OF LITHIUM ION CAPACITORS AND METHOD FOR PRODUCING SAME

(71) Applicants: KUREHA CORPORATION, Tokyo (JP); KURARAY CO., LTD., Kurashiki-shi, Okayama (JP); KURARAY CHEMICAL CO., LTD., Bizen-shi, Okayama (JP)

(72) Inventors: Naohiro Sonobe, Tokyo (JP); Yasuhiro Tada, Tokyo (JP); Jiro Masuko, Tokyo (JP); Hajime Komatsu, Tokyo (JP); Junichi Arima, Bizen (JP); Akimi Ogawa, Bizen (JP); Kenichi Koyakumaru, Bizen (JP); Kiyoto Otsuka, Bizen (JP); Hideharu Iwasaki, Kurashiki (JP); Junsang Cho, Kurashiki (JP)

(73) Assignees: KUREHA CORPORATION, Tokyo (JP); KURARAY CO., LTD., Kurashiki-Shi, Okayama (JP); KURARAY CHEMICAL CO., LTD., Bizen-Shi, Okayama (JP)

(*) Notice: Subject to any disclaimer, the term of this patent is extended or adjusted under 35 U.S.C. 154(b) by 0 days.

(21) Appl. No.: 14/424,676

(22) PCT Filed: Aug. 30, 2013

(86) PCT No.: PCT/JP2013/073350
§ 371 (c)(1),
(2) Date: Feb. 27, 2015

(87) PCT Pub. No.: WO2014/034859
PCT Pub. Date: Mar. 6, 2014

(65) Prior Publication Data
US 2015/0270072 A1 Sep. 24, 2015

(30) Foreign Application Priority Data
Aug. 30, 2012 (JP) ................. 2012-190708

(51) Int. Cl.
*C01B 31/00* (2006.01)
*H01G 11/50* (2013.01)
*H01G 11/34* (2013.01)
*H01M 4/587* (2010.01)
*C01B 31/02* (2006.01)
*H01G 11/42* (2013.01)
*H01G 11/66* (2013.01)
*H01M 10/0525* (2010.01)
*H01G 11/24* (2013.01)
*H01G 11/44* (2013.01)

(52) U.S. Cl.
CPC ............ *H01G 11/50* (2013.01); *C01B 31/00* (2013.01); *C01B 31/02* (2013.01); *H01G 11/34* (2013.01); *H01G 11/42* (2013.01); *H01G 11/66* (2013.01); *H01M 4/587* (2013.01); *C01P 2004/61* (2013.01); *C01P 2006/80* (2013.01); *H01G 11/24* (2013.01); *H01G 11/44* (2013.01); *H01M 10/0525* (2013.01); *Y02E 60/13* (2013.01); *Y02T 10/7011* (2013.01); *Y02T 10/7022* (2013.01); *Y10T 428/2982* (2015.01)

(58) Field of Classification Search
CPC ... C01B 31/02; C01B 31/00; C01P 2006/80; C01P 2004/61; C01P 2006/12
See application file for complete search history.

(56) References Cited

U.S. PATENT DOCUMENTS

| 4,693,879 | A | * | 9/1987 | Yoshimura | ........... B01D 33/073 209/270 |
|---|---|---|---|---|---|
| 5,834,138 | A | | 11/1998 | Yamada et al. | |
| 5,972,536 | A | | 10/1999 | Yamada et al. | |
| 5,985,489 | A | | 11/1999 | Ohsaki et al. | |
| 6,303,249 | B1 | | 10/2001 | Sonobe et al. | |

(Continued)

FOREIGN PATENT DOCUMENTS

| EP | 0817295 A2 | 1/1998 |
|---|---|---|
| JP | 62-27316 A | 2/1987 |

(Continued)

OTHER PUBLICATIONS

International Search Report, issued in PCT/JP2013/073350, dated Nov. 19, 2013.

(Continued)

*Primary Examiner* — Stuart Hendrickson
(74) *Attorney, Agent, or Firm* — Birch, Stewart, Kolasch & Birch, LLP

(57) ABSTRACT

The object of the present invention is to provide a manufacturing method of carbonaceous material for a negative electrode of lithium ion capacitors, wherein the carbonaceous material is obtained from plant-derived char as a source, potassium and iron are sufficiently removed, and an average particle diameter thereof is small; and a carbonaceous material for a negative electrode of lithium ion capacitors.

The object can be solved by a method for manufacturing a carbonaceous material having an average diameter of 3 to 30 μm, for a negative electrode of lithium ion capacitors comprising the steps of: (1) heating plant-derived char having an average particle diameter of 100 to 10000 μm at 500° C. to 1250° C. under an inert gas atmosphere containing a halogen compound to demineralize in a gas-phase, (2) pulverizing a carbon precursor obtained by the demineralization in a gas-phase, (3) calcining the pulverized carbon precursor at less than 1100° C. under a non-oxidizing gas atmosphere.

9 Claims, No Drawings

(56) References Cited

U.S. PATENT DOCUMENTS

| | | | |
|---|---|---|---|
| 6,335,122 B1 | 1/2002 | Yamada et al. | |
| 6,475,461 B1 | 11/2002 | Ohsaki et al. | |
| 7,141,230 B2 * | 11/2006 | Takeuchi | C01B 31/02 423/445 R |
| 8,574,533 B2 * | 11/2013 | Sonobe | C01B 31/02 252/502 |
| 2007/0287068 A1 | 12/2007 | Shimizu et al. | |

FOREIGN PATENT DOCUMENTS

| | | |
|---|---|---|
| JP | 2-83205 A | 3/1990 |
| JP | 6-89721 A | 3/1994 |
| JP | 7-230803 A | 8/1995 |
| JP | 8-112539 A | 5/1996 |
| JP | 9-161801 A | 6/1997 |
| JP | 10-21919 A | 1/1998 |
| JP | 2000-281325 A | 10/2000 |
| JP | 2006-128133 A | 5/2006 |
| JP | 2006-303330 A | 11/2006 |
| JP | 2007-42571 A | 2/2007 |
| JP | 2008-247643 A | 10/2008 |
| JP | 2011-29197 A | 2/2011 |
| WO | WO 96/30318 A1 | 10/1996 |
| WO | WO 97/01192 A1 | 1/1997 |
| WO | WO 2005/098999 A1 | 10/2005 |

OTHER PUBLICATIONS

Notification of the First Office Action (including an English translation thereof) issued in the corresponding Chinese Patent Application No. 201380044862.8 on Dec. 3, 2015.
Extended European Search Report, dated May 4, 2016, for European Application No. 13833948.6.
Chinese Office Action and English translation thereof, dated Sep. 5, 2016, for Chinese Application No. 201380044862.8.

* cited by examiner

CARBONACEOUS MATERIAL FOR NEGATIVE ELECTRODES OF LITHIUM ION CAPACITORS AND METHOD FOR PRODUCING SAME

TECHNICAL FIELD

The present invention relates to a carbonaceous material for a negative electrode of lithium-ion capacitors, and a process for manufacturing the same. According to the present invention, a plant-derived carbonaceous material for a negative electrode having an average particle diameter of 30 μm or less can be industrially manufactured in large quantity.

BACKGROUND ART

As a power supply for driving mobile devices such as a cellular phone and laptop computer, a lithium-ion secondary battery having high energy density and high capacity has been widely used for a long time. Further, lithium-ion capacitors having several times as much energy density as conventional EDLC (electric double-layer capacitor) are actively developed. In addition, the carbonaceous material is used as the negative electrode material, and particularly, the graphitic carbon material (graphite) is widely used.

Recently, small-sized lithium-ion batteries and lithium-ion capacitors capable of storing high energy are developed as a clean energy source for electric cars such as electric vehicle (EV) and hybrid electric vehicle (HEV), combining an internal combustion engine and batteries, and thus, they are expected to be served as a next generation secondary battery for vehicles. However, use conditions of the secondary battery for vehicles are severe compared to those of consumer applications. That is, it is required to improve charge-discharge capacity and cycle life in addition to the requirement of high energy density. In particular, high input/output performances in room temperature, and rapid output performances under low temperature for engines starting in cold areas, i.e. low-value resistance under low temperature is also required. In connection with this, the graphitic carbon material has an excellent energy density, but input/output performances thereof are poor due to high crystallinity. In particular, a problem such as a risk of lithium metal deposition under low temperature has been pointed out. On the other hand, a non-graphitizable carbon material (hard carbon) has excellent input/output performances under low temperature. Further, it has a certain characteristic in that the risk of lithium metal deposition under overcharge is low. Even further, it has an excellent characteristic in that SOC (State of charge) is easily controlled due to a character that an electric potential changes depending on the amount of doped lithium. Therefore, the non-graphitizable carbon material is developed as a negative electrode of the next generation secondary battery for vehicles.

For example, JP PATENT No. 4023504 (Patent literature 1) proposes a negative electrode material for non-aqueous electrolyte secondary batteries containing a carbonaceous material derived from plant-originated polymer, which contains a total of 0.2 to 20 weight % of metallic elements of Na, K, Ca, Mg, Al, and Si, and phosphorus, and sulfur, as total elements.

In Patent literature 1, the metallic elements are involved in the carbonaceous material derived from plant-originated polymer, to thereby reduce a crystallinity of the carbonaceous material. As a result, the carbonaceous material becomes a non-graphitizable carbon material. However, the carbonaceous material contains a large amount of metallic elements. Therefore, the carbonaceous material has adverse effects on battery performance, and further, the crystallinity and a pore-uniformity thereof are also low.

Japanese Unexamined Patent Publication No. 6-89721 (JP Patent No. 3399015; Patent literature 2) discloses a non-graphitizable carbon material obtained by heat treating at 600° C. under an atmosphere condition wherein volatile-matters developed from a carbon precursor are removed from the reaction system. The non-graphitizable carbon material is a negative electrode material having a ratio by weight (Ps) of less than 0.59 which is one of a stacking structured-carbon atom, or a stacking index (SI) of less than 0.76. Further, Japanese Unexamined Patent Publication No. 9-161801 (JP Patent No. 3719790; Patent literature 3) discloses a carbonaceous material for an electrode obtained by carbonizing a plant-derived organic substance selected from the group consisting of palm shell, chaff, broad-leaf tree, needle-leaf tree, and bamboo. The carbonaceous material is for an electrode of non-aqueous, electrolyte secondary batteries and has 1 mL/g or more of a volume of pores having a diameter of 0.003 to 5 μm, 100 m$^2$/g or less of a specific surface area determined by a BET method, and 5 to 100 μm of an average particle diameter. However, these carbonaceous materials are heat treated under vacuum, and thus pores are excessively developed in sites wherein volatile-matters are actively removed. Therefore, these carbonaceous materials provide causes of increase of irreversible capacity and decrease of cycle performances.

Therefore, carbonaceous materials for a negative electrode of non-graphitizable carbon material wherein an entrance diameter of the pores is controlled, are examined. In particular, Japanese Unexamined Patent Publication No. 7-230803 (JP Patent No. 2844302; Patent literature 4) discloses a carbonaceous negative electrode material for lithium secondary batteries wherein the entrance diameter of the pores on the surface of the non-graphitizable carbon fine particles which constitutes carbonaceous negative electrode material, is controlled, so that lithium ions in the electrolytic solution of lithium secondary batteries can pass the entrance of the pores and organic solvent therein cannot substantially pass the entrance of the pores. In this Patent literature, the adsorbability of organic solvent in the non-graphitizable carbon material is reduced and the discharge capacity of the non-graphitizable carbon material is improved by depositing pyrolyzed carbon in the surface of non-graphitizable carbon. Further, in the working examples, the non-graphitizable carbon obtained by heat treating palm shell chars after dealkalization treatment using hydrochloric acid, is flowed together with nitrogen gas saturated with toluene while heating, to thereby deposit pyrolyzed carbon in the surface. An irreversible capacity of the carbonaceous material for a negative electrode is reduced. However, an internal resistance based on the carbon material per se is increased at a low temperature, and thus a sufficient output performance for a short time cannot be obtained.

Japanese Unexamined Patent Publication No. 2007-42571 (Patent literature 5) proposes a carbon particle for a negative electrode of lithium secondary batteries wherein an average (002) interlayer spacing d002 determined by XRD measurement is 0.340 to 0.390 nm, a He true density is 1.40 to 2.00 g/cc, and an amount of $CO_2$ adsorption is 0.01~500 cc/g, as a negative electrode material having a low irreversible capacity and an excellent output performance. In Patent literature 5, carbon particles having little fine pores can be obtained by heat treating a resin constitutionally containing a specific phenol derivative, and thereby the irreversible capacity of a battery using the carbon material is reduced. However, the input/output performances of the carbon material at a low temperature are not sufficient. Further, the charge-discharge capacity is also reduced by pore decrease.

Further, WO2005/98999 (Patent literature 6) discloses a carbonaceous material obtained by heat treating petroleum or coal tar in a specific condition, wherein an average (002) interlayer spacing d002 is 0.355 to 0.400 nm and a true density is 1.50 to 1.60 g/cm$^3$. The carbonaceous material which is a negative electrode material for non-aqueous electrolyte secondary batteries, has excellent input/output performances at high current. However, the carbonaceous material does not have sufficient input/output performances at low temperature. Further, a main component of the carbonaceous materials in Patent literatures 5 and 6 is a synthetic polymer prepared from fossil resource. Thus, a shift from the fossil resource to a biomass material has been demanded, from the viewpoint of a conservation of the global environment.

On the other hand, a discharge capacity per charge of the electric double-layer capacitor is low compared to the lithium-ion secondary battery, but the electric double-layer capacitor has excellent, instant input/output performances. Further, in the electric double-layer capacitor, charge and discharge can be performed over several tens of thousands of cycles, and thus the electric double-layer capacitor is maintenance-free. Recently, a hybrid capacitor which is a combination of the lithium-ion secondary battery with a principle of electricity storage in the electric double-layer capacitor, has been developed (Patent literature 9). In such an electric double-layer capacitor, lithium-ions are stored and doped in the negative electrode. The non-graphitizable carbon material is expected to serve as the negative electrode.

The inventors of the present invention found that the carbonaceous material for a negative electrode prepared by using the plant-derived organic substance as a carbon source can be doped with a large amount of active material, and thus it has promise as a negative electrode material (Patent literatures 3 and 7). However, when the plant-derived organic substance is used as a carbon source of carbonaceous material for a negative electrode, potassium found in organic, raw material had an unsuitable effect on the doping and dedoping performance. In order to solve the above problem, Patent literature 7 discloses a method for reducing an amount of potassium wherein the plant-derived organic substance is washed by acid so as to demineralize (hereinafter referred to as a demineralization in liquid-phase) (Patent literature 7). That is to say, in the method for preparing a carbonaceous material for a negative electrode wherein the plant-derived organic substance is used as a carbon source, the demineralizing treatment is required.

CITATION LIST

Patent Literature

[Patent literature 1] Japanese Unexamined Patent Publication (Kokai) No. 2006-128133
[Patent literature 2] Japanese Unexamined Patent Publication (Kokai) No. 6-89721
[Patent literature 3] Japanese Unexamined Patent Publication (Kokai) No. 9-161801
[Patent literature 4] Japanese Unexamined Patent Publication (Kokai) No. 7-230803
[Patent literature 5] Japanese Unexamined Patent Publication (Kokai) No. 2007-42571
[Patent literature 6] WO2005/98999
[Patent literature 7] Japanese Unexamined Patent Publication (Kokai) No. 10-21919
[Patent literature 8] Japanese Unexamined Patent Publication (Kokai) No. 2000-281325
[Patent literature 9] Japanese Unexamined Patent Publication (Kokai) No. 2006-303330

SUMMARY OF INVENTION

Technical Problem

Patent literature 7 discloses that a demineralization rate is remarkably reduced in the case that materials to be treated have large particle diameters at the time of demineralization in liquid-phase, and thus the particle diameter of the carbonaceous material is preferably 100 µm or less. In fact, a carbonaceous material precursor having a particle diameter of 25 µm is demineralized in liquid-phase using hydrochloric acid to thereby obtain a carbonaceous material precursor having an amount of potassium of 0.1 weight % or less. In the demineralization in liquid-phase, it is necessary to remove an mineral-eluted solution by filtration. (In the present specification, the "mineral" means substances containing elements other than carbon, hydrogen, oxygen, and nitrogen, which are contained in raw material of the carbon material for a negative electrode or contaminated in the manufacturing process.) However, if the average particle diameter becomes smaller, it takes washing water a long time to pass through a tank wherein carbon materials are filled at the time of filtration. Thus, it is very difficult to efficiently remove the solution in a short time. Even if the solution can be removed, the obtained products are expensive. Thus, for practical purpose, it is difficult to industrially-produce the carbonaceous material with an average particle diameter of 20 µm for a negative electrode of lithium-ion capacitors by using demineralization in liquid-phase.

Therefore, the object of the present invention is to provide a method for manufacturing a carbonaceous material having a small average particle diameter, for a negative electrode of lithium-ion capacitors, wherein the carbonaceous material is produced by using plant-derived char as a starting material, and potassium is sufficiently demineralized; and a carbonaceous material for a negative electrode of lithium-ion capacitors.

Solution to Problem

The present inventors have conducted intensive studies into a demineralization method which can be used industrially in the method for manufacturing a plant-derived carbonaceous material for a negative electrode, and as a result, surprisingly found that potassium can be removed by heating the plant-derived char in an inert gas atmosphere containing a halogen compound at 500° C.-1250° C. (hereinafter, sometimes referred to as a demineralization in a gas-phase), and the plant-derived carbonaceous material for a negative electrode can be industrially manufactured in large quantity by using the method of demineralization in a gas-phase.

Further, the present inventors examined the performance of lithium-ion capacitors wherein the carbonaceous material obtained by demineralization in a liquid-phase or demineralization in a gas-phase is used as the negative electrode, and then, found that there was a tendency that a carbonaceous material obtained by the demineralization in a gas-phase has an excellent doping and dedoping performance. Furthermore, the present inventors examined the carbonaceous material obtained by demineralization in a liquid-phase or demineralization in a gas-phase, and then, found that iron in the carbonaceous material obtained by demineralization in the gas-phase was remarkably removed more than 10 times than in the carbonaceous material obtained by demineralization in the liquid-phase. If iron is present in carbon as iron oxide, it is considered that a reaction caused by the insertion of lithium into iron oxide occurs, and it has an unsuitable effect on the doping and dedoping performance. Further, there is a possibility that iron oxide is reduced to metallic iron, and then impurities are produced. In addition, when iron is present in carbon as metallic iron or iron is eluted to an electrolytic solution to re-deposit, there is a possibility that the temperature of the battery rises by occurrences of micro short circuits. The carbonaceous material obtained by demineralization in the gas-phase is excellent in the removal of iron. Therefore, it has an excellent doping and dedoping performance compared to the carbonaceous material obtained by demineralization in the liquid-phase, and safety-assured lithium-ion capacitors can be manufactured thereby.

Further, the lithium-ion capacitors using the carbonaceous material for a negative electrode of the present invention exhibit excellent input/output performances and low resistance at a low temperature, compared to a carbonaceous material derived from a petroleum pitch.

The present invention is based on the above findings.

Therefore, the present invention relates to:

[1] a method for manufacturing a carbonaceous material having an average particle diameter of 3 to 30 μm, for a negative electrode of lithium-ion capacitors comprising the steps of:
(1) heating plant-derived char having an average particle diameter of 100 to 10000 μm at 500° C. to 1250° C. under an inert gas atmosphere containing a halogen compound to demineralize in the gas-phase,
(2) pulverizing a carbon precursor demineralized in the gas-phase, and
(3) heat treating the pulverized carbon precursor at less than 1100° C. under a non-oxidizing gas atmosphere,
[2] the method for manufacturing a carbonaceous material for a negative electrode of lithium-ion capacitors of the item [1], further comprise a step of removing particles having a particle diameter of 1 μm or less so that a volume thereof became 3 volume % or less, during or after the pulverizing step (2),
[3] a carbonaceous material having an average particle diameter of 3 to 30 μm and a specific surface area of less than 175 $m^2/g$, for a negative electrode of lithium-ion capacitors, obtained by a method comprising the steps of:
(1) heating plant-derived char having an average particle diameter of 100 to 10000 μm at 500° C. to 1250° C. under an inert gas atmosphere containing a halogen compound to demineralize in the gas-phase,
(2) pulverizing a carbon precursor demineralized in the gas-phase, and
(3) heat treating the pulverized carbon precursor at less than 1100° C. under an non-oxidizing gas atmosphere,
[4] the carbonaceous material for a negative electrode of lithium-ion capacitors of the item [3], wherein the method further comprises a step of removing particles having a particle diameter of 1 μm or less so that a volume thereof became 3 volume % or less, during or after the pulverizing step (2),
[5] a carbonaceous material for a negative electrode of lithium-ion capacitors of the item [3] or [4], wherein a specific surface area is 20 to 150 $m^2/g$, an amount of potassium contained therein is 0.1 weight % or less, and an amount of iron contained therein is 0.02 weight % or less,
[6] a negative electrode of lithium-ion capacitors comprising the carbonaceous material of any one of the items [3] to [5]
[7] the negative electrode of lithium-ion capacitors of the item [6], wherein an active material layer exists on one surface or both surfaces of metal current collector substrate, and a thickness of the active material layer on one surface is 80 μm or less,
[8] a lithium-ion capacitor comprising the carbonaceous material of any one of the items [3] to [5], or
[9] a lithium-ion capacitor comprising the carbonaceous material of the item [6] or [7].

Patent literature 8 discloses an activated carbon having a high adsorbability of trihalomethane and humic acid, and further discloses that a carbonaceous material having residue on ignition of 3 weight % or more is heated in a current of inert gas containing a halogen compound. It is speculated that a pore structure suitable for adsorption of trihalomethane and humic acid is formed on a surface of carbon through the above heat treatment.

In the heat treatment disclosed in Patent literature 8, the halogen compound is used in the same manner as the demineralization in the gas-phase of the present invention. However, in the heat treatment of the Example in Patent literature 8, a mixture ratio of the halogen compound is high i.e. 20%. Further, Patent literature 4 discloses that if the heat treatment at 500° C. or less, or 1300° C. or more is carried out, the adsorbability of trihalomethane becomes lower by a subsequent activation treatment. Therefore, the object of the heat treatment in Patent literature 8 is to prepare the activated carbon which has a specific surface area of 1000 $m^2/g$ or more and the high adsorbability of trihalomethane and humic acid, by the formation of pores on the surface of carbon and the activation treatment. That is, the above object is different from that of the demineralization in the gas-phase in the present invention. Further, the activated carbon having a high specific surface area for adsorbing toxic substances is prepared in Patent literature 8. Therefore, the technical field of the carbonaceous material having low specific surface area for lithium ion capacitors of the present invention is different from that of the invention disclosed in Patent literature 8.

Further, the treatment by demineralization in the gas-phase in the present invention can improve electrical characteristics as a negative electrode of carbonaceous material for a negative electrode of lithium ion capacitors. On the other hand, Patent literature 8 discloses that the adsorbability of trihalomethane and humic acid is improved by the above heat treatment, but does not disclose or suggest that the electrical characteristics as a negative electrode of carbonaceous material are improved thereby. Therefore, it is surprising that the carbonaceous material for the negative electrode of lithium ion capacitors having excellent electrical characteristics as a negative electrode can be obtained by heat treatment with a halogen compound.

Advantageous Effects of Invention

According to the method for manufacturing the carbonaceous material for a negative electrode of lithium-ion capacitors of the present invention, a plant-derived carbonaceous material for a negative electrode, which has excellent electrical characteristics as a negative electrode, can be industrially obtained in large quantity. Specifically, according to the method for manufacturing of the present invention, the plant-derived carbonaceous material for a negative electrode wherein potassium and iron are efficiently removed, can be industrially obtained in large quantity, and a lithium-ion capacitor having excellent input/output performances and low resistance at a low temperature can be manufactured by using the plant-derived carbonaceous material. In addition, according to the method for manufacturing of the present invention, the carbonaceous material wherein the average particle diameter thereof is small, can be industrially obtained in large quantity, and thus, a thin negative electrode can be prepared. That is to say, the resistance of a negative electrode can be reduced, and thus a lithium-ion capacitor having a low irreversible capacity and an excellent output performance, and capable of rapidly charging, can be prepared. The lithium-ion capacitor using carbonaceous material for a negative electrode of the present invention, exhibits excellent output performance and cycle performance, compared to a carbonaceous material derived from petroleum pitch. Further, the lithium-ion capacitor having a low irreversible capacity can be obtained by removing particles with a particle diameter of 1 μm or less from carbonaceous material for a negative electrode. Even further, according to the carbonaceous material for a negative electrode of a lithium-ion capacitor of the present invention, alternating-current resistance value of a cell can be reduced because the specific surface area thereof is less than 175 m$^2$/g.

DESCRIPTION OF EMBODIMENTS

<1> Method for Manufacturing Carbonaceous Material for Negative Electrode of Lithium-Ion Capacitors The method for manufacturing a carbonaceous material having an average particle diameter of 3 to 30 μm, for a negative electrode of lithium ion capacitors of the present invention comprises the steps of: (1) heating plant-derived char having an average particle diameter of 100 to 10000 μm at 500° C. to 1250° C. under an inert gas atmosphere containing halogen compound to demineralize in gas-phase, (2) pulverizing a carbon precursor demineralized in gas-phase, and (3) heat treating the pulverized carbon precursor at less than 1100° C. under a non-oxidizing gas atmosphere. Further, the method for manufacturing of the present invention may be comprise a step of removing particles having a particle diameter of 1 μm or less so that a volume thereof became 3 volume % or less, with or after the pulverizing step (2).
(Plant-Derived Char)

A raw plant of the plant-derived char (carbon precursor) which may be used in the present invention, is not particularly limited, for example, there may be mentioned palm shell, coffee bean, tea leaf, sugar cane, fruit (mandarin orange, or banana), straw, broad-leaf tree, needle-leaf tree, bamboo, and chaff. The above raw plants can be used alone or in combination of two or more. However, palm shell is preferable because palm shells can be available in large amounts.

A palm which is a raw of the palm shell is not particularly limited, but includes oil palm (palm tree), coconut, salak, or double coconut. Palm shells obtained from these palms can be used alone or in combination of two or more, but palm shell derived from coconut or oil palm is most preferable. This is because coconut or oil palm is used as a raw of foods, detergents, or biodiesel fuels, as a result the palm shell thereof is generated as a biomass waste in large amounts. In the method for manufacturing of the present invention, a form of char (such as palm shell char) which is obtained by preliminarily heat treating the above plants is available, and thus the char is preferably used as a source thereof. Generally, the char means a carbon-riched, powdery solid substance which is generated by heating coal without melting and softening. However, in the present specification, the char also means a carbon-riched, powdery solid substance which is generated by heating organic substance without melting and softening.

A method for preparing chars from plants is not particularly limited. However, for example, the char may be prepared by heating a plant material under an inert gas atmosphere at 300° C. or more The carbonaceous materials for a negative electrode prepared from these plant-derived chars can be doped with a large amount of active material, and thus it is useful as the negative electrode material for lithium-ion capacitors. However, the plant-derived char contains a wide variety of metallic elements. In particular, it contains a large amount of potassium. (For example, the palm shell char contains about 0.3% of potassium.) Further, if the carbonaceous material prepared from a plant-derived char containing a large amount of a metallic element such as iron (For example, palm shell char contains 0.1% of iron.) is used as the negative electrode, it will have an unsuitable effect on electrochemical performance and safety. Therefore, it is preferable that the amounts of potassium, iron and the like contained in the carbonaceous material for a negative electrode are reduced as much as possible.

Further, the plant-derived char contains alkali metal such as sodium, alkali earth metal such as magnesium or calcium, transition metal such as iron or copper, and other elements in addition to potassium, and thus it is preferable that the amounts of these elements contained therein are also reduced. If these metals are contained therein, there is a high possibility that impurities are eluted to the electrolytic solution in dedoping from the negative electrode, and it has adverse effects on battery performance and safety.
<<Demineralization Step in Gas-Phase (1)>>

In the demineralization step in the gas-phase (1) in the method for the manufacturing of the present invention, the plant-derived char is heated at 500° C. to 1250° C. in an inert gas atmosphere containing a halogen compound. Potassium and iron can be effectively removed by demineralization in the gas-phase. Specifically, iron can be effectively removed compared to demineralization in the liquid-phase. Further, alkali metal and alkali earth metal other than potassium can be removed, and further transition metal such as copper or nickel can also be removed.

The halogen compound used in demineralization in the gas-phase is not particularly limited, for example, there may be mentioned a fluorine, chlorine, bromine, hydrogen fluoride, hydrogen chloride, hydrogen bromide, iodine bromide, chlorine fluoride (ClF), iodine chloride (ICl), iodine bromide (IBr), bromine chloride (BrCl), or the like, compound capable of generating the above halogen compound by pyrolysis, or a mixture thereof, but hydrogen chloride is preferable.

The halogen compound may be mixed with an inert gas and used. The mixed inert gas is not particularly limited, so long as it does not react with carbonaceous material at the treatment temperature. For example, there may be mentioned nitrogen gas, helium gas, argon gas, or krypton gas, or a mixed gas thereof, but nitrogen gas is preferable. Furthermore, it is preferable that a concentration of impure gas, in particular oxygen gas contained in the inert gas, is decreased at the lowest possible level. For example, an acceptable oxygen concentration is 0 to 2000 ppm, more preferably 0 to 1000 ppm.

In demineralization in the gas-phase, a mixture ratio between the inert gas and the halogen compound is not limited, so long as the plant-derived char is sufficiently demineralized. However, an amount of halogen compound with respect to the inert gas is preferably 0.1 to 10.0 volume %, more preferably 0.3 to 5.0 volume %, further preferably 0.5 to 3.0 volume %.

A temperature of demineralization in the gas-phase is 500° C. to 1250° C., preferably 600° C. to 1250° C., more preferably 700° C. to 1200° C., further preferably 800° C. to 1150° C. If the temperature is lower than 500° C., the demineralization efficiency becomes lower and the demineralization may be insufficient. If the temperature is higher than 1250° C., the plant-derived char may be activated by the halogen compound.

Further, a time of demineralization in the gas-phase is not particularly limited, but preferably 5 to 300 minutes, more preferably 10 to 200 minutes, further preferably 30 to 150 minutes.

The demineralization step in the gas-phase (1) is carried out to remove potassium, iron, and the like contained in the plant-derived char. The amount of potassium after the demineralization step in the gas-phase (1) is preferably 0.1 weight % (1000 ppm) or less, more preferably 0.05 weight % (500 ppm) or less, further preferably 0.03 weight % (300 ppm) or less. Further, the amounts of iron is preferably 0.02 weight % (200 ppm) or less, more preferably 0.015 weight % (150 ppm) or less, more preferably 0.010 weight % (100 ppm) or less, further preferably 0.005 weight % (50 ppm) or less. If the amount of potassium is higher than 0.1 weight % (1000 ppm) and the amount of iron is higher than 0.02 weight % (200 ppm), dedoping capacity becomes lower and non-dedoping capacity becomes higher in the lithium-ion capacitor using the obtained carbonaceous material for a negative electrode. In addition to that, when metal elements are eluted to an electrolytic solution and re-deposit, a short circuit occurs and thus it sometimes becomes a serious safety problem.

The amount of potassium and the amount of iron can be measured by an ICP atomic emission spectroscopy, a fluorescent X-ray analysis or the like. The ICP atomic emission spectroscopy is for a microanalysis, and therefore an analytical precision thereof is easily influenced by slight, uneven element distribution. Thus, the fluorescent X-ray analysis which is a usual method as an analysis of powder, is preferable. In the present specification, the amount of potassium and the amount of iron are measured by the fluorescent X-ray analysis.

The mechanism of effectively removing potassium, other alkali metal, alkali earth metal, and transition metal have not been fully elucidated, but are presumed to be as follows. Metals such as potassium contained in the plant-derived char are reacted with a halogen compound diffused in the char to become a metallic halide such as chloride or bromide. Then, it is considered that potassium, iron, and the like can be removed by volatilizing (detaching) the generated metallic halide by heat. In the case of the mechanism of the generation of metallic halide by the diffusion of a halogen compound into char and the reaction of metal with the halogen compound, it is considered that potassium and iron are effectively removed due to a high diffusion of a halogen compound in the gas-phase compared to the demineralization in liquid-phase due to a high diffusion of a halogen compound in the gas-phase. However, the present invention is by no means limited to the above explanation.

A particle diameter of the plant-derived char used in demineralization in the gas-phase is not particularly limited. However, if the particle diameter is too small, it becomes difficult to separate the plant-derived char from a gas phase containing the removed potassium. Therefore, the lower limit of the particle diameter is preferably 100 μm or more, more preferably 300 μm or more. The upper limit of the particle diameter is preferably 10000 μm or less, more preferably 8000 μm or less, further preferably 5000 μm or less.

Further, an apparatus used in demineralization in the gas-phase is not limited, so long as it can heat a mixed gas of inert gas and a halogen compound while mixing them. However, for example, demineralization in the gas-phase can be performed by a continuous-type or batch-type in-layer circulating method using a fluidized bed furnace. A supplied amount (circulated amount) of the mixed gas is also not limited, but, for example, is 1 mL/minute or more, preferably 5 mL/minute or more, further preferably 10 mL/minute or more with respect to 1 g of plant-derived char.

In demineralization in the gas-phase, it is preferable that heat treatment in the absence of a halogen compound is carried out after the heat treatment in the inert gas atmosphere containing a halogen compound. That is, a halogen is contained in the carbon precursor by contact with a halogen compound, and thus it is preferable that a halogen contained in the char is removed by heat treatment in the absence of a halogen compound. In particular, the heat treatment in the absence of a halogen compound is carried out by heating the carbon precursor in an inert gas atmosphere without a halogen compound at 500° C. to 1250° C. Preferably, a temperature of the heat treatment in the absence of a halogen compound is the same temperature as the first heat treatment in the inert gas atmosphere containing a halogen compound, or is higher than the temperature thereof. For example, a halogen can be removed therefrom by carrying out heat treatment while cutting off the halogen compound supply, after the heat treatment with the halogen compound. A time of heat treatment in the absence of the halogen compound is not particularly limited, but preferably 5 to 300 minutes, more preferably 10 to 200 minutes, further 10 to 100 minutes.

<<Pulverizing Step (2)>>

In the pulverizing step (2) in the present invention, the carbon precursor in which potassium and iron are removed, is pulverized so as to provide an average particle diameter of 3 to 30 μm. That is to say, an average particle diameter of the resulting carbonaceous material is adjusted to 3 to 30 μm through the pulverizing step (2). Further, the pulverizing step (2) preferably comprises a classification. The average particle diameter thereof can be accurately adjusted and further particles having a particle diameter of 1 μm or less can be removed. The plant-derived char (carbon precursor) demineralized in the gas-phase does not melt through heat treatment. Thus, an order of the pulverizing step (2) is not particularly limited so long as it is carried out after the demineralization step in the gas-phase (1), in view of an efficiency of the demineralization step in the gas-phase. However, it is preferably carried out before the heat treatment step (3), mentioned below. The reasons for this are as follows. If the pulverizing step (2) is carried out before the demineralization step in the gas-phase (1), a recovery rate (yield) in the demineralization in the gas-phase is decreased because the diameter of particles is fine. In addition, equipment for collecting the particles grows in stature and thus a volume efficiency of equipment becomes low. However, it is not excluded that the pulverization is carried out after the heat treatment step.

A grinder used for pulverization is not particularly limited, for example, but a jet mill, a ball mill, a hammer mill, or a rod mill can be used alone or in combination of two or more. However, the jet mill with classification means is preferable, from the viewpoint of a decrease in the development of fine particles. On the other hand, when the ball mill, hammer mill, or rod mill is used, the fine particles can be removed by classification after pulverization.

(Classification)

As for the classification, there may be mentioned a classification by sieve, wet type classification, or dry type classification. A wet type classifier includes, for example, one based on the principle of gravitational classification, inertial classification, hydraulic classification, centrifugal classification or the like. Further, a dry type classifier includes, for example, ones based on principle of sedimentation classification, mechanical classification, centrifugal classification, or the like.

In the pulverizing step, the pulverization and the classification can be carried out using one apparatus. For example, the pulverization and the classification can be carried out by using a jet mill with dry type classification means. Further, an independent classifier and a pulverizer can also be used. In this case, the pulverization and the classification may be continuously or discontinuously carried out.

(Removal of Particles Having a Particle Diameter of 1 μm or Less)

In the manufacturing method of the present invention, it is preferable that particles having a particle diameter of 1 μm are removed so that amounts thereof become 3 volume % or less, as mentioned above. An order of the removal of particles having a particle diameter of 1 μm or less is not limited, so long as it is carried out after the pulverization, but it is preferable that the removal is carried out at the same time as the classification in the pulverizing step (2).

The particles having a particle diameter of 1 μm contained in the carbonaceous material prepared by the manufacturing method of the present invention is 3 volume % or less, more preferably 2.5 volume % or less, further preferably 2.0 volume % or less. The lithium-ion capacitor having a low irreversible capacity can be obtained by removing the particles having a particle diameter of 1 μm.

(Average Particle Diameter)

An average particle diameter ($Dv_{50}$) of carbonaceous material for lithium-ion capacitors obtained through the method of the present invention is 3 to 30 μm. If the average particle diameter is less than 3 μm, fine particles are increased and then the specific surface area of the carbonaceous material is increased. As a result, a pre-doping of unnecessary lithium ions which cannot contribute to the substantive charge and discharge, is require. Thus, it is not preferable. Further, if a negative electrode is manufactured using the resulting carbonaceous material, each cavity between carbonaceous materials becomes small, and thus a mobility of lithium ions in the electrolyte solution is suppressed. Therefore, it is not preferable. The lower limit of the average particle diameter is preferably 3 μm or more, further preferably 4 μm or more, most preferably 5 μm or more. On the other hand, the average particle diameter of 30 μm or less is preferable. This is because a diffusion-free path of lithium ions in the particle is short, and thus it is possible to rapidly charge and discharge. Further, in the lithium-ion capacitors, it is important to enlarge an electrode area in order to improve the input/output performances. Thus, it is required to reduce the coating thickness of an active material to a current collector in an electrode preparation. In order to reduce the coating thickness, it is required to reduce the particle diameter of the active material. From this perspective, the upper limit of the average particle diameter is preferably 30 μm or less, more preferably 19 μm or less, further preferably 17 μm or less, further preferably 17 μm or less, further preferably 16 μm or less, most preferably 15 μm or less.

The pulverized carbon precursor is heat treated in the heat treatment step (3). At this time, the pulverized carbon precursor shrinks at a rate of about 0 to 20% according to the heat treatment condition. Thus, it is preferable that the average particle diameter of the pulverized carbon precursor is increased in the range of about 0 to 20%, in order to finally obtain the carbonaceous material for a negative electrode of lithium-ion capacitors having an average particle diameter ($Dv_{50}$) of 3 to 30 μm. The average particle diameter after pulverization is not limited so long as the average particle diameter of the resulting carbonaceous material becomes 3 to 30 μm. However, the average particle diameter ($Dv_{50}$) is preferably adjusted to 3 to 36 μm. The average particle diameter is more preferably 3 to 22.8 μm, further preferably 3 to 20.4 μm, further preferably 3 to 19.2 μm, most preferably 3 to 18 μm.

<<Heat Treatment Step (3)>>

In the heat treatment step (3) in the manufacturing method of the present invention, the pulverized carbon precursor is heated at less than 1000° C. under a non-oxidizing gas atmosphere. This step is generally referred to as "final heat treatment" in the technical field of the present invention. Further, in the calcination step of the present invention, a pre-heat treatment can be optionally carried out before the final heat treatment.

(Final Heat Treatment)

The temperature of the final heat treatment is not limited, so long as it is less than 1100° C. The lower limit of the temperature is preferably 980° C. or more, more preferably 1000° C. or more, further preferably 1020° C. or more. The upper limit of the temperature is less than 1100° C., preferably 1080° C. or less, further preferably 1060° C. or less, most preferably 1050° C. or less. If the temperature of the heat treatment is less than less than 980° C., functional groups in the carbonaceous material is increased and thus there is a possibility that the carbonaceous material reacts with lithium, which is not preferable. If the temperature of the heat treatment exceeds 1100° C., dedoping capacity is decreased, which is not preferable.

Final heat treatment is preferably performed in a non-oxidizing gas atmosphere. Examples of non-oxidizing gases include helium, nitrogen, argon, or the like, and these may be used alone or as a mixture. Further, the final heat treatment may be performed in a gas atmosphere in which a halogen gas such as chlorine is mixed with the non-oxidizing gas described above. The supplied amount (circulated amount) of the gas is also not limited, but is 1 mL/minute or more, preferably 5 mL/minute or more, further preferably 10 mL/minute or more per 1 gram of the demineralized carbon precursor. In addition, final heat treatment can be performed under reduced pressure at a pressure of 10 kPa or less, for example. The final heat treatment time is not particularly limited. However, for example, the final heat treatment can be performed for 0.05 to 10 hours as a retention time of 1000° C. or more, preferably for 0.05 to 3 hours, and more preferably for 0.05 to 1 hour.

In the present specification, the "carbon precursor" means the plant-derived char before implementation of the final heat treatment.

(Pre-Heat Treatment)

In the manufacturing method of the present invention, the pre-heat treatment can be carried out. The pre-heat treatment is performed by calcining a carbon source at a temperature of at least 300° C. and less than 900° C. For example, a volatile matter such as $CO_2$, $COCH_4$, and $H_2$, and tar content, are removed by the pre-heat treatment. Thus the generation of these components can be reduced and the load of the furnace can be reduced in the final heat treatment. When the pre-heat treatment temperature is less than 300° C., de-tarring becomes insufficient, and the amount of tar or gas generated in the final heat treatment after pulverization becomes large. This may adhere to the particle surface and cause a decrease in battery performance without being able to maintain the surface properties after pulverization, which is not preferable. On the other hand, when the pre-heat treatment temperature is 900° C. or higher, the temperature exceeds the tar-generating temperature range, and the used energy efficiency decreases, which is not preferable. Furthermore, the generated tar causes a secondary decomposition reaction, and the tar adheres to the carbon precursor and causes a decrease in performance, which is not preferable.

Pre-heat treatment is performed in an inert gas atmosphere, and examples of inert gases include nitrogen, argon, or the like. In addition, pre-heat treatment can be performed under reduced pressure at a pressure of 10 kPa or less, for example. The time of pre-heat treatment is not particularly limited, but, for example, preliminary calcination may be performed for 0.5 to 10 hours, and is preferably performed for 1 to 5 hours. In the present specification, the pre-heat treatment means a heat treatment in the inert gas atmosphere at a temperature of at least 300° C. and less than 900° C. Therefore, the treatment of demineralization in the gas-phase may be referred to as pre-heat treatment.

Further, the pulverizing step (2) may be carried out after the pre-heat treatment.

<2> Carbonaceous Material for a Negative Electrode for Lithium-Ion Capacitors

The carbonaceous material for a negative electrode for lithium-ion capacitors has an average particle diameter of 3 to 30 μm and a specific surface area of less than 175 $m^2/g$, and can be obtained by the steps of: (1) heating plant-derived char having an average particle diameter of 100 to 10000 μm at 500° C. to 1250° C. under an inert gas atmosphere containing a halogen compound to demineralize in the gas-phase, (2) pulverizing a carbon precursor demineralized in the gas-phase, and (3) calcining the pulverized carbon precursor at less than 1100° C. under a non-oxidizing gas atmosphere. That is, the carbonaceous material for a negative electrode for lithium-ion capacitors of the present invention can be obtained by the above method for manufacturing a carbonaceous material for a negative electrode for lithium-ion capacitors.

In the carbonaceous material for a negative electrode of the present invention, the demineralization step in the gas-phase (1), the pulverizing step (2), the heat treatment step (3), and the plant-derived char used as the carbon source, and the like, is described in the above item of the method for manufacturing a carbonaceous material for a negative electrode of lithium-ion capacitors.

In the carbonaceous material for a negative electrode of the present invention, it is important that a specific surface area is less than 175 $m^2/g$. The physical properties, such as an average particle diameter, a specific surface area, an amount of potassium, an amount of iron, are not particularly limited, but, for example, the carbonaceous material having the specific surface area of 20 to 50 $m^2/g$, the amount of potassium of 0.1 weight % or less, and the amount of iron of 0.02 weight % or less, is preferable.

(Non-Graphitizable Carbon Material)

The carbonaceous material for a negative electrode of the present invention is prepared from the plant-derived char as a carbon source, and thus, it is non-graphitizable carbon material. The non-graphitizable carbon causes little expansion and constriction at the time of the doping and dedoping of lithium to exhibit a high cycle durability.

The plant-derived char, which is the carbon source of the carbonaceous material for a negative electrode of the present invention, is described in the above item of "plant-derived char" in the method for manufacturing in the present invention.

(Average Particle Diameter)

An average particle diameter (volume average particle diameter: $Dv_{50}$) of carbonaceous material for a negative electrode of the present invention is preferably 3 to 30 μm. If the average particle diameter is less than 3 μm, fine particles are increased, and thus a pre-doping of unnecessary lithium ions, which cannot contribute to the substantive charge and discharge, is required. Thus, this is not preferable. Further, if a negative electrode is manufactured using the carbonaceous material, each space between carbonaceous materials becomes small, and thus a mobility of lithium ions in the electrolyte solution is suppressed. Therefore, this is not preferable. The lower limit of the average particle diameter is preferably 3 μm or more, further preferably 4 μm or more, most preferably 5 μm or more. On the other hand, when the average particle diameter is 30 μm or less, a diffusion-free path of lithium ions in the particle is short, and thus it is possible to rapidly charge and discharge. Further, in order to improve the input/output performances, it is important to enlarge an electrode area in the lithium-ion capacitors. Thus, it is required to reduce the coating thickness of an active material to a current collector in an electrode preparation. In order to reduce the coating thickness, it is required to reduce the particle diameter of the active material. From this perspective, the upper limit of the average particle diameter is preferably 30 μm or less, more preferably 19 μm or less, further preferably 17 μm or less, further preferably 17 μm or less, further preferably 16 μm or less, most preferably 15 μm or less.

(Specific Surface Area)

The specific surface area of the carbonaceous material for a negative electrode is less than 175 $m^2/g$, preferably 20 to 150 $m^2/g$, more preferably 30 to 140 $m^2/g$, further preferably from more than 30 to 140 $m^2/g$ or less. The carbonaceous material having an excessively large, specific surface area requires a large amount of solvents in the electrode manufacturing, and thus it becomes difficult to handle the carbonaceous material. In addition, end structures of carbon i.e. sites that react with lithium-ions, are increased as the specific surface area is increased, and therefore, there is a possibility that the irreversible capacity increases. If the specific surface area of the carbonaceous material is less than 175 $m^2/g$, the alternating-current resistance value of a cell is reduced. Further, if the specific surface area thereof is 20 to 150 $m^2/g$, the resistance value of lithium-ion capacitor can be lowered, and thus the output density of a lithium-ion capacitor can be improved.

(Amount of Potassium)

The amount of potassium of the carbonaceous material for the negative electrode of the present invention is 0.1 weight % or less, more preferably 0.05 weight % or less, further preferably 0.03 weight % or less. In the lithium-ion capacitors using a carbonaceous material for the negative electrode having an amount of potassium of more than 0.5 weight %, dedoping capacity may become lower and non-dedoping capacity may become higher.

(Amount of Iron)

The amount of iron of the carbonaceous material for the negative electrode of the present invention is 0.02 weight % or less, more preferably 0.015 weight % or less, more preferably 0.01 weight % or less, further preferably 0.005 weight % or less. In the lithium-ion capacitors using a carbonaceous material for the negative electrode having a large amount of iron, there is a possibility that the capacitor generates heat by occurrences of micro short circuits. Further, there is a possibility that the above carbonaceous material has an adverse effect on doping and dedoping performances.

<H/C Ratio>

The H/C ratio of the carbonaceous material for the negative electrode of the present invention is not particularly limited. The H/C ratio was determined by measuring hydrogen atoms and carbon atoms by elemental analysis. Since the hydrogen content of the carbonaceous material decreases as the degree of carbonization increases, the H/C ratio tends to decrease. Accordingly, the H/C ratio is effective as an index expressing the degree of carbonization. The H/C ratio of the carbonaceous material of the present invention is not limited, but is 0.1 or less, preferably 0.08 or less. The H/C ratio is particularly preferably 0.05 or less. When the H/C ratio of hydrogen atoms to carbon atoms exceeds 0.1, the amount of functional groups present in the carbonaceous material increases, and the irreversible capacity increases due to a reaction with lithium. Therefore, it is not preferable.

<3> Negative Electrode for Lithium-Ion Capacitors and Lithium-Ion Capacitor

The negative electrode for lithium-ion capacitors of the present invention contains carbonaceous material for a negative electrode for lithium-ion capacitors of the present invention. The lithium-ion capacitor of the present invention contains the negative electrode for lithium-ion capacitors of the present invention. The lithium-ion capacitor of the present invention has an excellent output performance and maintenance-free characteristic, compared to the non-aqueous electrolyte secondary battery.

Preferably, lithium-ions are chemically or electrochemically stored and doped in the negative electrode for lithium-ion capacitors of the present invention. That is, the lithium-ion capacitor, wherein a negative electrode potential is reduced by preliminary doping with lithium-ions, is preferable.

In the lithium-ion capacitor of the present invention, a procedure for doping with lithium-ions in a negative electrode is not particularly limited. For example, a supply source of the lithium-ions such as metal lithium capable of supplying lithium-ions may be mounted in the capacitor cell as a lithium electrode. As for the amount of the supply source of the lithium-ions (weight of metal lithium or the like), the amount capable of obtaining the predetermined capacity of the negative electrode may be enough.

The negative electrode for lithium-ion capacitors of the present invention contains the carbonaceous material for a negative electrode of lithium-ion capacitors of the present invention. The conventional methods can be used as a manufacturing method of the negative electrode. Specifically, it may be formed by: a) dispersing the negative electrode active material powder, a binder, and if necessary, an electrically conductive powder and a thickener such as CMC in an aqueous or organic solvent to obtain a slurry, and b) applying the slurry on the current collector or preliminarily forming the slurry into a sheet, and bonding the sheet on the current collector. As for the binder as used herein, for example, a rubber type binder such as SBR, a fluororesin such as polytetrafluoroethylene or polyvinylidene fluoride, or a thermoplastic resin such as a polypropylene or a polyethylene, or acrylate resin can be used. The amount of the binder to be used varies depending upon the electrical conductivity of the negative electrode active material, the electrode shape, and the like, but it is appropriate that 2 to 40 weight % of the binder are added to the negative electrode active material.

In addition, as for the electrically conductive material to be used (if necessary), there may be mentioned an acetylene black, a graphite, a metal powder or the like. The amount of the electrically conductive material to be used varies depending upon the electrical conductivity of the negative electrode active material, the electrode shape, and the like, but it is appropriate that 2 to 40 weight % of the electrically conductive material is added to the negative electrode active material.

The positive electrode active material for forming the positive electrode used in the present invention is not limited, so long as it can be reversibly doped with lithium-ions and anions such as tetra fluoroborate. The positive electrode active material includes, for example, an activated carbon, a conducting polymer, a polyacene and derivatives thereof, or the like. As to the particle size, the positive electrode active material such as the activated carbon having a conventional wide range of particle size can be used. For example, the average particle diameter (D50) thereof is 3 μm or more, preferably 3 to 30 μm. Further, an average pore diameter is preferably 10 nm or less. A specific surface area thereof is preferably 600~3000 $m^2/g$, and the specific surface area of 1300~2500 $m^2/g$ is specifically more preferable.

The positive electrode used in the present invention is formed by using the positive electrode active material powder, and the conventional methods can be used as manufacturing methods thereof, as is the case with the above negative electrode. Specifically, it may be formed by: a) dispersing the positive electrode active material powder, a binder, and if necessary, an electrically conductive powder and a thickener such as CMC in an aqueous or organic solvent to obtain a slurry, and b) applying the slurry on the current collector or preliminarily forming the slurry into a sheet, and bonding the sheet on the current collector. As for the binder as used herein, for example, a rubber type binder such as SBR, a fluororesin such as polytetrafluoroethylene or polyvinylidene fluoride, or a thermoplastic resin such as a polypropylene or a polyethylene, or acrylate resin can be used. The amount of the binder to be used varies depending upon the electrical conductivity of the positive electrode active material, the electrode shape, and the like, but it is appropriate that 2 to 40 weight % of the binder is added to the positive electrode active material.

In addition, as the electrically conductive material to be used (if necessary), there may be mentioned an acetylene black, a graphite, a metal powder or the like. The amount of the electrically conductive material to be used varies depending upon the electrical conductivity of the positive electrode active material, the electrode shape, and the like, but it is appropriate that 2 to 40 weight % of the electrically conductive material is added to the positive electrode active s material.

As an aprotic organic solvent capable of forming an aprotic organic solvent electrolytic solution in the lithium-ion capacitor of the present invention, for example, there may be mentioned ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane, or the like. Further, a liquid mixture having two or more of such aprotic organic solvents mixed may also be used.

In addition, any electrolyte may be used as an electrolyte to be dissolved in the above solvent alone or the mixed solvents, so long as it can generate lithium ions. Such electrolytes includes $LiClO_4$, $LiAsF_6$, $LiBF_4$, $LiPF_6$ or the like. The above electrolyte and solvent are mixed in a sufficiently dehydrated state to obtain an electrolytic solution. The concentration of the electrolyte in the electrolytic solution is preferably at least 0.1 mol/L, more preferably within a range from 0.5 to 1.5 mol/L, in order to reduce the internal resistance due to the electrolytic solution.

EXAMPLES

The present invention will now be further illustrated by, but is by no means limited to, the following Examples.

In addition, the measurement methods for the physical properties of the carbonaceous material for lithium ion capacitors of the present invention (the "average particle diameter", the "specific surface area", and the "measurement of potassium content, iron content, and the like (fluorescent X-ray analysis)") will be described hereinafter, but the physical properties described in this specification are based on values determined by the following methods.

<<Evaluation Test Items>>
(Particle Size Distribution)

A sample was added to an aqueous solution containing 3 mass % of surfactant (ToritonX100; Wako Pure Chemical Industries, Co., Ltd.), and treated for 10 minutes or more using an ultrasonic cleaner so as to be dispersed in the aqueous solution. The particle size distribution was measured using the resulting dispersion liquid and the particle diameter and size distribution measuring apparatus (Microtrac MT3000; NIKKISO CO., LTD.). The values of d10, d50, and d90 were measured as follows:

d10 was determined by the particle size yielding a cumulative volume of 10%.

d50 (central particle size) was determined by the particle size yielding a cumulative volume of 50%.

d90 was determined by the particle size yielding a cumulative volume of 90%.

(Specific Surface Area)

A sample of 0.1 g was applied to a sample tube, and then it was pre-treated at 300° C. for 5 hours. The sample part was cooled to a temperature of liquid nitrogen, and a nitrogen adsorption isotherm was measured using the specific surface area/pore distribution measuring apparatus (Belsorp28SA; BELL JAPAN, INC.) at the temperature thereof. The resulting adsorption isotherm was analyzed using BEL analysis software (Version4.0.13) so that the specific surface area was determined by selecting two points from a region of 0.01 or less of relative pressure and a region of 0.05 to 0.1 of relative pressure, wherein the highest correlation coefficient of the two points was obtained.

(Measurement of Potassium Content, Iron Content, or the Like)

In order to measure potassium content, iron content and other elements, a carbon sample containing predetermined amounts of potassium, iron, and other elements was prepared and standard curves showing relationships between an intensity of potassiumKα ray and potassium content, an intensity of ironKα ray and iron content, and the like were prepared by measuring the carbon sample using X-ray fluorescence spectrometer. Next, intensities of potassiumKα ray, ironKα ray, and the like of a sample to be tested were measured, and the potassium content, iron content, and the like of the sample were calculated from the prepared standard curves. The particle diameter, specific surface area, and metal contents were shown in Table 3. Fluorescent X-ray analysis was carried out using LAB CENTER XRF-1700 [Shimadzu Corporation] in accordance with the following conditions. A holder for an upper-irradiated system was used, and a measured area of a sample was defined as an inside of a circle of the holder with a diameter of 20 mm. The sample to be tested was placed by putting 0.5 g of the sample to be tested into a polyethylene container having an inner diameter of 25 mm and blocking an underside of the polyethylene container by plankton net. A measurement surface thereof was covered with a polypropylene film, and then the sample was measured. The conditions of X-ray source were defined as 40 kV and 60 mA. Potassium content was measured by: a) using LiF(200) as a dispersive crystal and gas-flow type proportional counter as a detector, and b) scanning the sample in the ranges of 90 to 140° (2θ) at 8°/min of scan speed. Iron content was measured by using LiF(200) as a dispersive crystal and scintillation counter as a detector, and scanning the sample in the ranges of 90 to 140° (2θ) at 8°/min of scan speed.

(Particle Size of Palm Shell Char and Particle Size Distribution)

A particle size of palm shell char was measured in accordance with the "Test method of activated carbon 5.3 Particle size, 5.4 Particle size distributions" of JIS K1474. A sieve having an opening size of 0.125 mm was put on a tray, and then six (6) or seven (7) sieves which had opening sizes in decreasing order from the top were put thereon. Then, the palm shell char was applied to the top sieve having an opening size of 5.600 mm, and sieved. When the particle diameter of the palm shell char was less than 0.125 mm, the particle diameter of the palm shell char was measured by the method for measuring particle size distribution of the carbonaceous material as described above.

Example 1

Nitrogen gas containing 1 volume % of hydrogen chloride gas was supplied at a flow rate of 10 L/minute to 100 g of the palm shell char A with a diameter of 2.360 to 0.850 mm (containing 98 weight % of particles with diameter of 2.360 to 0.850 mm) which was obtained by crushing palm shells and pyrolizing the crushed palm shells at 500° C. After the above treatment for 70 minutes at 975° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1000° C. for 360 minutes using a hot press furnace (Motoyama Inc.) while supplying argon gas at flow rate of 1.5 L/minute to obtain the carbonaceous material for a negative electrode of lithium-ion capacitors. The particle size, specific surface area, and metal contents were shown in Table 1.

Example 2

Nitrogen gas containing 1 volume % of hydrogen chloride gas was supplied at a flow rate of 10 L/minute to 100 g of the palm shell char A with a diameter of 2.360 to 0.850 mm (containing 98 weight % of particles with diameter of 2.360 to 0.850 mm) which was obtained by crushing palm shells and pyrolizing the crushed palm shells at 500° C. After the above treatment for 90 minutes at 950° C., only the hydrogen chloride gas supply was cut off, and then the resulting palm shell char A was heat-treated for 70 minutes to obtain 85 g of palm shell carbon precursor M. The resulting palm shell carbon precursor M of 85 g was preliminarily pulverized by ball mill to become pre-pulverized carbon with a central particle size of 7 μm, and then was pulverized and classified by compact jet mill (Co-Jet System α-mkIII). The carbon precursor was heat-treated at 1050° C. for 360 minutes using a pressurized calcination furnace (Motoyama Inc.) to obtain the carbonaceous material for a negative electrode of lithium-ion capacitors. The particle size, specific surface area, and metal contents were shown in Table 1.

<<Preparation Method of Electrode>>

A negative electrode was prepared using the carbonaceous materials obtained in Examples 1 and 2.

92 parts by weight of the carbonaceous material for a negative electrode of lithium-ion capacitors, 2 parts by weight of acetylene black, 6 parts by weight of PVDF (polyvinylidene fluoride), and 90 parts by weight of NMP (N-methyl pyrrolidone) were mixed to obtain a slurry. The resulting slurry was applied to the copper foil with a thickness of 14 μm. After being dried, it was pressed to prepare the positive electrode having a thickness of 60 μm. A density of the resulting electrode was 0.9 to 1.1 g/cm³.

<<Early Battery Capacity and Charge-Discharge Efficiency>>

The electrode prepared by the above preparation method was used as a working electrode, and metallic lithium was used as a counter electrode and a reference electrode. Then, a solution wherein $LiPF_6$ was dissolved at a concentration of 1 mole/liter into a solvent prepared by mixing ethylene carbonate and methyl ethyl carbonate at a volume ratio of 3:7, was used as an electrolytic solution, to prepare an electrochemical cell. A glass fiber, nonwoven fabric was used as a separator. The lithium doping was performed at 70 mA/g with respect to active material weight until the voltage reached 1 mV with respect to lithium potential. Further, the constant-voltage of 1 mV with respect to lithium potential was charged for 8 hours to thereby complete the doping. The resulting capacity (mAh/g) is defined as a charge capacity. Subsequently, the dedoping was performed at 70 mA/g with respect to active material weight until the voltage reached 2.5 mV with respect to lithium potential, and the obtained, discharged capacity was defined as a discharge capacity. A percentage of the discharge capacity with respect to the charge capacity was defined as a charge-discharge efficiency.

<<Total Resistance (Ω)>>

In the measurement of resistance at 25° C., the electrode prepared by the above preparation method was used as a working electrode, and a $LiCoO_2$ electrode was used as a counter electrode. The $LiCoO_2$ electrode used as a counter electrode consists of active material, acetylene black, and PVDF (polyvinylidene fluoride) at a mass ratio of 89:5:6. The density of the $LiCoO_2$ electrode was 3.0 g/cm³ and the capacity thereof was 165 mAh/g. The capacity of the positive electrode was designed to be about the same capacity of the working electrode. A solution wherein $LiPF_6$ was dissolved at a concentration of 1 mole/liter into a solvent prepared by mixing ethylene carbonate and methyl ethyl carbonate at a volume ratio of 3:7, was used as an electrolytic solution, to prepare a single layer laminated cell in the glove box under an argon atmosphere. A polyethylene microporous membrane was used as a separator.

The resistance measurement by the conventional current pause method was carried out using the resulting single layer laminated cell. Specifically, the resistance measurement by the current-rest-method was carried out in accordance with the method described in "Practical evaluation technology of lithium-ion battery and lithium-ion capacitor" (Shizukuni YADA, Technical Information Institute Co., Ltd, September, 2006) or Japanese Unexamined Patent Publication No. 2008-292272. This method is a method for measuring internal resistance by direct current. That is, a direct current is applied to the cell, and then an internal resistance and a time dependency thereof are evaluated by the voltage change at the time that the applied current is rested in each state of charge or discharge.

Charge and discharge currents were determined from the measurement results of the early charge-discharge capacities so as to correspond to 0.5C. Charging was performed until the cell voltage reached 4.2 V while repeating 12 minutes of charging and 1 minute of rest. Discharging was performed until the cell voltage reached 2.7 V while repeating 12 minutes of discharging and 1 minute of rest. The resistances were evaluated by using the point of third rest of discharging and the point of fifth rest of charging. The value of resistance (Rt) was calculated by the equation: Rt=ΔVt/Ir. The results are shown in Table 2.

TABLE 1

| | Particle size of carbonaceous material | | | Specific surface area m²/g | Metal contents in carbonaceous material | | | | | | | | | | | | |
|---|---|---|---|---|---|---|---|---|---|---|---|---|---|---|---|---|---|
| | D10 μm | d50 μm | d90 μm | | Al ppm | Ca ppm | Cr ppm | Cu ppm | Fe ppm | K ppm | Mg ppm | Na ppm | Ni ppm | P ppm | S ppm | Zn ppm | Zr ppm |
| Example 1 | 3 | 5 | 8 | 129 | 1102 | 162 | 12 | 1 | 50 | 5 | 24 | 10 | 6 | 213 | 113 | 0 | 0 |
| Example 2 | 3 | 5 | 8 | 47 | 1067 | 173 | 13 | 1 | 46 | 6 | 26 | 10 | 7 | 213 | 83 | 0 | 0 |

TABLE 2

|  | Electrode thickness μm | Electrode density g/cm³ | Discharge capacity mAh/g | Charge capacity mAh/g | Charge-discharge efficiency % | Irreversible capacity mAh/g | Resistance after 5 charge Ω | Resistance after 3 discharge Ω |
|---|---|---|---|---|---|---|---|---|
| Example 1 | 61 | 1.00 | 516 | 337 | 65 | 179 | 9.44 | 9.33 |
| Example 2 | 63 | 0.95 | 437 | 311 | 71 | 126 | 11.89 | 11.44 |

It is presumed that the resistance values after 3 discharge cycles and 5 charge cycles of the lithium-ion batteries using the carbonaceous material obtained in examples 1 and 2 as a negative electrode material, shows an excellent output performance thereof.

Example 3

In this Example, the carbonaceous material having a specific surface area of 47 m²/g was prepared.

Nitrogen gas containing 1 volume % of hydrogen chloride gas was supplied at a flow rate of 10 L/minute to 100 g of the palm shell char A with diameter of 2.50 to 0.80 mm (containing 98 weight % of particles with a diameter of 2.50 to 0.80 mm) which was obtained by crushing palm shells and pyrolizing the crushed palm shells at 500° C. After the above treatment for 70 minutes at 975° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1050° C. for 360 minutes using a pressurized calcination furnace (Motoyama Inc.) while supplying argon gas at flow rate of 1.5 L/minute to obtain the carbonaceous material for a negative electrode of lithium-ion capacitors. The potassium content, and iron content of the resulting carbonaceous material were measured according to the "Measurement of potassium content, iron content, or the like". The particle size, specific surface area, and metal contents were shown in Table 3.

Example 4

In this Example, the carbonaceous material having a specific surface area of 80 m²/g was prepared.

Nitrogen gas containing 1 volume % of hydrogen chloride gas was supplied at a flow rate of 10 L/minute to 100 g of the palm shell char A with a diameter of 2.50 to 0.80 mm (containing 98 weight % of particles with a diameter of 2.50 to 0.80 mm) which was obtained by crushing palm shells and pyrolizing the crushed palm shells at 500° C. After the above treatment for 70 minutes at 975° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1000° C. for 360 minutes using a pressurized calcination furnace (Motoyama Inc.) while supplying argon gas at flow rate of 1.5 L/minute to obtain the carbonaceous material for a negative electrode of lithium-ion capacitors. The particle size, specific surface area, and metal contents were shown in Table 3.

Example 5

In this Example, the carbonaceous material having a specific surface area of 129 m²/g was prepared.

Nitrogen gas containing 1 volume % of hydrogen chloride gas was supplied at a flow rate of 10 L/minute to 100 g of the palm shell char A with a diameter of 2.50 to 0.80 mm (containing 98 weight % of particles with diameter of 2.50 to 0.80 mm) which was obtained by crushing palm shells and pyrolizing the crushed palm shells at 500° C. After the above treatment for 70 minutes at 900° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1000° C. for 240 minutes using a pressurized calcination furnace (Motoyama Inc.) while supplying argon gas at flow rate of 1.5 L/minute to obtain the carbonaceous material for a negative electrode of lithium-ion capacitors. The particle size, specific surface area, and metal contents were shown in Table 3.

Comparative Example 1

In this Comparative Example, the carbonaceous material having a specific surface area of 9 m²/g was prepared.

Nitrogen gas containing 1 volume % of hydrogen chloride gas was supplied at a flow rate of 10 L/minute to 100 g of the palm shell char A with a diameter of 2.50 to 0.80 mm (containing 98 weight % of particles with diameter of 2.50 to 0.80 mm) which was obtained by crushing palm shells and pyrolizing the crushed palm shells at 500° C. After the above treatment for 70 minutes at 1050° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1100° C. for 360 minutes using a pressurized calcination furnace (Motoyama Inc.) while supplying argon gas at flow rate of 1.5 L/minute to obtain the carbonaceous material for a negative electrode of lithium-ion capacitors. The particle size, specific surface area, and metal contents were shown in Table 3.

Comparative Example 2

In this Comparative Example, the carbonaceous material having a specific surface area of 175 m²/g was prepared.

Nitrogen gas containing 1 volume % of hydrogen chloride gas was supplied at a flow rate of 10 L/minute to 100 g of the palm shell char A with diameter of 2.50 to 0.80 mm (containing 98 weight % of particles with a diameter of 2.50 to 0.80 mm) which was obtained by crushing palm shells and pyrolizing the crushed palm shells at 500° C. After the above treatment for 70 minutes at 900° C., only the hydrogen chloride gas supply was cut off, and then the resulting palm shell char A was heat-treated for 40 minutes to obtain 85 g of palm shell carbon precursor F. The resulting palm shell carbon precursor F of 85 g was preliminarily pulverized by ball mill to become pre-pulverized carbon with a central particle size of 8 μm, and then was pulverized and classified by compact jet mill (Co-Jet System α-mkIII). The carbon precursor was heat-treated at 1100° C. for 120 minutes using a pressurized calcination furnace (Motoyama Inc.) while supplying argon gas at flow rate of 1.5 L/minute to obtain the carbonaceous material for a negative electrode of lithium-ion capacitors. The particle size, specific surface area, and metal contents were shown in Table 3.

Comparative Example 3

In this Comparative Example, the carbonaceous material without demineralization treatment in gas-phase was prepared.

100 g of the palm shell char A with a diameter of 2.50 to 0.80 mm (containing 98 weight % of particles with diameter of 2.50 to 0.80 mm) which was obtained by crushing palm shells and pyrolizing the crushed palm shells at 500° C., was preliminary pulverized by ball mill to become pre-pulverized carbon with central particle size of 8 μm, and then was pulverized and classified by compact jet mill (Co-Jet System α-mkIII). The carbon precursor was heat-treated at 1050° C. for 360 minutes using a pressurized calcination furnace (Motoyama Inc.) while supplying argon gas at flow rate of 1.5 L/minute to obtain the carbonaceous material for evaluating an amount of metal contents. The particle size, specific surface area, and metal contents were shown in Table 3.

TABLE 3

| | Demineralization conditions Temp./Time ° C./Minute | Final heat-treatment conditions Temp./Time ° C./Minute | Particle size of carbonaceous material | | | Specific surface area SSA m²/g |
|---|---|---|---|---|---|---|
| | | | D10 μm | D50 μm | D90 μm | |
| Example 3 | 975/70 | 1050/360 | 3 | 5 | 8 | 47 |
| Example 4 | 975/70 | 1000/360 | 2 | 5 | 8 | 80 |
| Example 5 | 900/70 | 1000/240 | 3 | 5 | 8 | 129 |
| Comparative Example 1 | 1050/70 | 1100/360 | 2 | 6 | 8 | 9 |
| Comparative Example 2 | 900/70 | 1000/120 | 3 | 6 | 9 | 175 |
| Comparative Example 3 | None | 1050/360 | 6 | 10 | 20 | 560 |

| | Metal contents in carbonaceous material | | | | | | | | | | | | |
|---|---|---|---|---|---|---|---|---|---|---|---|---|---|
| | Al ppm | Ca ppm | Cr ppm | Cu ppm | Fe ppm | K ppm | Mg ppm | Na ppm | Ni ppm | P ppm | S ppm | Zn ppm | Zr ppm |
| Example 3 | 560 | 173 | 13 | 1 | 46 | 6 | 26 | 10 | 7 | 213 | 83 | 0 | 0 |
| Example 4 | 740 | 150 | 11 | 1 | 43 | 4 | 20 | 14 | 5 | 230 | 120 | 0 | 0 |
| Example 5 | 608 | 162 | 12 | 1 | 50 | 5 | 24 | 10 | 6 | 213 | 113 | 0 | 0 |
| Comparative Example 1 | 750 | 120 | 10 | 1 | 35 | 3 | 25 | 11 | 6 | 220 | 98 | 0 | 0 |
| Comparative Example 2 | 820 | 210 | 58 | 1 | 79 | 14 | 9 | 36 | 16 | 135 | 242 | 0 | 0 |
| Comparative Example 3 | 2700 | 2500 | 65 | 1 | 650 | 3500 | 32 | 43 | 12 | 340 | 300 | 0 | 1 |

The conditions of demineralization and calcination, the physical properties of the particle, and the metal contents of the carbonaceous material are shown in Table 3. As shown in the results of Table 3, when the metal contents of carbonaceous materials obtained in Examples 3 to 5 and Comparative Examples 1 and 2, and the metal contents of carbonaceous material obtained in Comparative example 3 were compared, it was confirmed that the contents of metal such as potassium, calcium, aluminum, and iron were drastically reduced by the demineralization treatment in the gas-phase, <<Preparation Method of Electrode>>

Negative electrodes for evaluating cells were prepared using the carbonaceous materials obtained in Examples 3 to 5 and Comparative examples 1 and 2, in order to measure the charge-discharge capacity of the negative electrode. 94 parts by weight of the carbonaceous material, and 6 parts by weight of PVDF (polyvinylidene fluoride; #1120 made by the Kureha Corporation) were mixed using a solvent i.e. NMP (N-methyl pyrrolidone) so that the solid content concentration became 54%, to thereby obtain a slurry to be applied. Subsequently, the resulting slurry was applied to the copper foil with a thickness of 18 μm, and dried at 80° C. for 10 minutes. It was rolling-pressed and secondary dried at 120° C. for 3 hours under vacuum conditions to prepare the positive electrode having a thickness of the applied electrode of about 40 μm. A density of the resulting electrode was 0.89 to 0.93 g/cm³. The resulting rolled electrode was punched into a circle shape with a diameter of 14 mm, to use it as the negative electrode for evaluation.

<<Preparation of Negative Electrode Cell Using Carbonaceous Material and Evaluation of Charge-Discharge Capacity and Charge-Discharge Efficiency>>

The electrode (diameter of 14 mm) prepared in the above preparation method as the working electrode, the metallic lithium with a thickness of 200 μm (diameter of 15 mm) as the counter electrode, a polypropylene separator (Celgard#2400), and EC/DEC (1/1) solvent containing 1M $LiPF_6$ as an electrolytic solution, were used to prepare the 2032 type negative electrode half-cell in the glove box under an argon atmosphere. The charge-discharge test of the prepared negative electrode half-cell was performed using the commercially-available charge-discharge tester (TOSCAT3100; TOYO SYSTEM CO., LTD). The negative electrode half-cell was placed in a thermostatic chamber at 25° C. The constant current charge was performed at a rate of 70 mA/g with respect to active material weight until the voltage reached 1 mV with respect to lithium potential, and then the constant-voltage of 1 mV with respect to lithium potential was charged for 8 hours to thereby complete the charging. The obtained-capacity (mAh/g) was defined as a charge capacity. Subsequently, the constant current charge was performed at a rate of 70 mA/g with respect to active material weight until the voltage reached 2.5 mV with respect to lithium potential, and the obtained-discharged capacity was defined as a discharge capacity. A difference between the charge capacity and the discharge capacity was defined as an irreversible capacity, and a percentage of the discharge capacity with respect to the charge capacity was defined as a charge-discharge efficiency.

The battery performances (thickness of electrode, density, capacity, efficiency vs. Li metal positive electrode) of negative electrode half cells using the carbonaceous materials obtained in Examples 3 to 5, and Comparative Examples 1 to 2 are shown in Table 4.

TABLE 4

| | Electrode thickness μm | Electrode density g/cm³ | Charge capacity mAh | Discharge capacity mAh | Irreversible capacity mAh | Efficiency % |
|---|---|---|---|---|---|---|
| Example 3 | 43 | 0.91 | 2.21 | 1.73 | 0.48 | 78.3 |
| Example 4 | 42 | 0.93 | 2.55 | 1.81 | 0.74 | 71.0 |
| Example 5 | 40 | 0.93 | 2.49 | 1.76 | 0.73 | 70.7 |
| Comparative Example 1 | 40 | 0.91 | 2.32 | 1.87 | 0.45 | 80.6 |
| Comparative Example 2 | 45 | 0.89 | 2.31 | 1.66 | 0.65 | 71.9 |

From the results in Table 4, it is known that the negative electrode half cells using the carbonaceous materials obtained in Examples 3 to 5, and Comparative Examples 1 to 2 have the following negative electrode performance. That is, it exhibits the discharge capacity of a range of 1.66 to 1.87 mAh, and the charge-discharge efficiency of a range of 70.7 to 80.6%.

<<Preparation Method of Lithium-Ion Capacitors Using Carbonaceous Material>>

Negative electrode cells were prepared by repeating the above preparation method of a negative electrode half-cell using the carbonaceous materials obtained in Examples 3 to 5, and Comparative Examples 1 to 2. Then, Lithium-ions were pre-doped in the carbonaceous materials by shorting the carbonaceous material and lithium positive electrode. Then, the pre-doped negative electrode half cells were disassembled in the glove box under an argon atmosphere. HC electrodes were dismounted therefrom and used as the electrode for the lithium-ion capacitor. Regarding the positive electrode for the lithium-ion capacitor, the commercially-available activated carbon-applied electrode for EDLC (MDLC-105N2, Hohsen corporation) wherein the activated carbon was applied to the aluminum foil with a thickness of 30 μm, the thickness thereof is 60 to 70 μm, and the electrode density is 0.65 to 0.70 g/cm³, was punched into a circle shape with a diameter of 15 mm, and used as the positive electrode (about 15 F/cc) for the LIC. Subsequently, the polypropylene separator (Celgard#2400), and EC/DEC (1/1) solvent containing 1M $LiPF_6$ as an electrolytic solution, were used to prepare the 2032 type lithium-ion capacitor in the glove box under an argon atmosphere. The charge-discharge test and the evaluation of impedance characteristic of the prepared lithium-ion capacitor were performed using the commercially-available charge-discharge tester (TOSCAT3100; TOYO SYSTEM CO., LTD) and the commercially-available impedance analyzer (Soatron1225B/1287), respectively. The lithium-ion capacitor was placed in a thermostatic chamber at 25° C. The constant current charge was performed at a rate of 1C until the voltage reached 4.0 V, and further the constant-voltage of 4.0V was charged for 12 hours to thereby complete the charging. Subsequently, the constant current and low voltage charge at a rate of 1C (stop condition is 2 hours) and constant current discharge at a rate of 1C were repeated thrice, and a capacity after the above charge-discharge was defined as a charge-discharge capacity (mAh). A difference between the charge capacity and the discharge capacity was defined as an irreversible capacity, and a percentage of the discharge capacity with respect to the charge capacity was defined as a charge-discharge efficiency. The alternating-current resistance of the lithium-ion capacitor was measured by measuring alternating-current impedance of the fully-charged lithium-ion capacitor on the condition that an amplified voltage is 10 mV, and a frequency is a range of 0.1 Hz to 1 MHz.

The battery performance of the lithium-ion capacitors using the carbonaceous materials obtained in Examples 3 to 5 and Comparative Examples 1 to 2 are shown in Table 5.

TABLE 5

| | LIC performance (Electrode weight, Thickness, Charge-discharge capacity, Resistance value) | | | | | | | | | |
|---|---|---|---|---|---|---|---|---|---|---|
| | Electrode thickness | | Electrode weight | | LIC capacity | | | Alternating-current resistance (ESR) | | |
| | Positive electrode μm | Negative electrode μm | Positive electrode mg | Negative electrode mg | Charge capacity mAh | Discharge capacity mAh | Efficiency % | 1.0 KHz Ω | 1.0 Hz Ω | 0.1 Hz Ω |
| Example 3 | 61 | 44 | 6.73 | 6.56 | 0.338 | 0.336 | 99.4 | 5.3 | 7.1 | 8.8 |
| Example 4 | 63 | 42 | 6.72 | 6.35 | 0.335 | 0.334 | 99.7 | 5.2 | 6.9 | 8.4 |

TABLE 5-continued

LIC performance (Electrode weight, Thickness, Charge-discharge capacity, Resistance value)

| | Electrode thickness | | Electrode weight | | LIC capacity | | | Alternating-current resistance (ESR) | | |
|---|---|---|---|---|---|---|---|---|---|---|
| | Positive electrode μm | Negative electrode μm | Positive electrode mg | Negative electrode mg | Charge capacity mAh | Discharge capacity mAh | Efficiency % | 1.0 KHz Ω | 1.0 Hz Ω | 0.1 Hz Ω |
| Example 5 | 64 | 40 | 6.78 | 6.31 | 0.373 | 0.372 | 99.7 | 5.4 | 7.2 | 8.9 |
| Comparative Example 1 | 62 | 45 | 6.79 | 6.35 | 0.423 | 0.411 | 97.2 | 5.1 | 6.8 | 8.7 |
| Comparative Example 2 | 61 | 41 | 6.81 | 6.20 | 0.336 | 0.333 | 99.1 | 6.2 | 8.4 | 10.3 |

From the results of Table 5, the carbonaceous material obtained in Comparative Example 1 has smaller specific surface area (i.e. 9 m$^2$/g) than those obtained in Examples 3 to 5, and it is known that the lithium-ion capacitor using the same has a slightly-high charge-discharge capacity, but has a low charge-discharge efficiency, compared to the lithium-ion capacitors using the carbonaceous materials obtained in Examples 3 to 5. Further, the carbonaceous material obtained in Comparative Example 2 has a large specific surface area (i.e. 175 m$^2$/g) compared to those obtained in Examples 3 to 5, and it is known that the lithium-ion capacitor using the carbonaceous material obtained in Comparative Example 1 has the same charge-discharge capacity as those in Examples 3 to 5, but has a high resistance of cell. Therefore, it is presumed that the lithium-ion capacitors using the carbonaceous materials obtained in Examples 3 to 5 has an excellent input/output performance because it has a high early charge-discharge efficiency, and a low alternating-current resistance value of a cell after 3 cycles.

INDUSTRIAL APPLICABILITY

According to the method for manufacturing carbonaceous material for a negative electrode of lithium-ion capacitors, potassium and iron can be efficiently removed, and thus the plant-derived carbonaceous material for a negative electrode having an average particle diameter of less than 20 μm can be industrially manufactured in large quantity. Further, the lithium-ion capacitors using the carbonaceous material of the present invention exhibits an excellent output performance (rate performance) and cycle performance, and thus can be used as batteries of the hybrid vehicles (HEV) and the electrical vehicles (EV), in which the long service life and high input/output performances are required.

The invention claimed is:

1. A method for manufacturing a non-graphitizable carbonaceous material derived from a plant having an average particle diameter of 3 to 30 μm and a specific surface area of 47 to 175 m$^2$/g, for a negative electrode of lithium-ion capacitors comprising the steps of:
   (1) heating plant-derived char having an average particle diameter of 100 to 10000 μm at 500° C. to 1250° C. under an inert gas atmosphere containing a chlorine compound to demineralize in the gas-phase, so that an amount of potassium in the resulting carbonaceous material is 0.1 weight % or less, and an amount of iron in the resulting carbonaceous material is 0.02 weight % or less,
   (2) pulverizing a carbon precursor demineralized in the gas-phase, and
   (3) heat treating the pulverized carbon precursor at less than 1100° C. under a non-oxidizing gas atmosphere.

2. The method for manufacturing a non-graphitizable carbonaceous material derived from a plant for a negative electrode of lithium-ion capacitors according to claim 1, further comprises a step of removing particles having a particle diameter of 1 μm or less so that a volume thereof became 3 volume % or less, during or after the pulverizing step (2).

3. A non-graphitizable carbonaceous material derived from a plant having an average particle diameter of 3 to 30 μm and a specific surface area of 47 to 175 m$^2$/g, for a negative electrode of lithium-ion capacitors, obtained by a method comprising the steps of:
   (1) heating plant-derived char having an average particle diameter of 100 to 10000 μm at 500° C. to 1250° C. under an inert gas atmosphere containing a chlorine compound to demineralize in the gas-phase, so that an amount of potassium in the resulting carbonaceous material is 0.1 weight % or less, and an amount of iron in the resulting carbonaceous material is 0.02 weight % or less,
   (2) pulverizing a carbon precursor demineralized in the gas-phase, and
   (3) heat treating the pulverized carbon precursor at less than 1100° C. under an non-oxidizing gas atmosphere.

4. The non-graphitizable carbonaceous material derived from a plant for a negative electrode of lithium-ion capacitors according to claim 3, wherein the method further comprises a step of removing particles having a particle diameter of 1 μm or less so that a volume thereof became 3 volume % or less, during or after the pulverizing step (2).

5. The non-graphitizable carbonaceous material derived from a plant for a negative electrode of lithium-ion capacitors according to claim 3, wherein the specific surface area is 47 to 150 m$^2$/g,
   the amount of potassium contained in the resulting carbonaceous material is 0.1 weight % or less, and
   the amount of iron contained therein is 0.02 weight % or less.

6. A negative electrode of lithium-ion capacitors comprising the non-graphitizable carbonaceous material according to claim 3.

7. The negative electrode of lithium-ion capacitors according to claim 6, wherein an active material layer exists on one surface or both surfaces of metal current collector, and a thickness of the active material layer on one surface is 80 μm or less.

8. A lithium-ion capacitor comprising the non-graphitizable carbonaceous material according to claim 3.

9. A lithium-ion capacitor comprising the non-graphitizable carbonaceous material according to claim 6.

* * * * *